United States Patent [19]
Simmonds et al.

[11] Patent Number: 5,251,167
[45] Date of Patent: Oct. 5, 1993

[54] METHOD AND APPARATUS FOR PROCESSING SIGN-EXTENSION BITS GENERATED BY MODIFIED BOOTH ALGORITHM

[75] Inventors: Stephen M. Simmonds, Mountain View; John M. Lade, Pacifica, both of Calif.; Greg A. Marek, Livonia, Mich.

[73] Assignee: Amdahl Corporation, Sunnyvale, Calif.

[21] Appl. No.: 792,715

[22] Filed: Nov. 15, 1991

[51] Int. Cl.$^5$ .............................................. G06F 7/52
[52] U.S. Cl. ................................................... 364/760
[58] Field of Search .............. 364/760, 759, 757, 754

[56] References Cited

U.S. PATENT DOCUMENTS

| | | | |
|---|---|---|---|
| 3,840,727 | 10/1974 | Amdahl et al. | 364/760 |
| 4,755,962 | 7/1988 | Mor | 364/760 |
| 4,761,756 | 8/1988 | Lee et al. | 364/760 X |
| 4,791,601 | 12/1988 | Tamaka | 364/760 |
| 4,817,029 | 3/1989 | Finegold | 364/760 |

*Primary Examiner*—Tan V. Mai
*Attorney, Agent, or Firm*—Fliesler, Dubb, Meyer & Lovejoy

[57] ABSTRACT

A method and apparatus for adding signed partial products without generating sign extension subfields is disclosed. The method and apparatus are particularly useful when employed in conjunction with multiplication algorithms such as the 3-bit modified Booth algorithm and the like. Rather than adding a sign extension subfield to extend the left side of each partial product row into alignment with the leftmost bit position of the sum field (e.g., the full product field), a special sign-extension "correction" factor is added to the nonextended partial products. The correction factor mimics the effect of summing the sign-extension bits which would conventionally have been added to the partial product rows. The special correction factor contains fewer bits than the total number of bits contained in all the eliminated sign extension portions, and accordingly, less computer circuitry and/or computer time is required for performing the partial product summation operation. A method which minimizes the computer circuitry or time needed for generating the correction factor is also disclosed.

12 Claims, 4 Drawing Sheets

FIG.—3

METHOD AND APPARATUS FOR PROCESSING SIGN-EXTENSION BITS GENERATED BY MODIFIED BOOTH ALGORITHM

BACKGROUND

1. Field of the Invention

The invention relates generally to computing systems which multiply signed and unsigned binary numbers. The invention relates more specifically to digital computers which perform multiplication using a modified Booth algorithm.

2. Cross Reference to Related Patents

The following U.S. patent(s) is/are assigned to the assignee of the present application, is/are related to the present application and its/their disclosures is/are incorporated herein by reference:

(A) U.S. Pat. No. 3,840,727 issued Oct. 8, 1974 to Amdahl et al, and entitled, BINARY MULTIPLICATION BY ADDITION WITH NON-OVERLAPPING MULTIPLIER RECODING; and (B) U.S. Pat. No. 4,761,756 issued Aug. 2, 1988 to Lee et al, and entitled, SIGNED MULTIPLIER WITH THREE PORT ADDER AND AUTOMATIC ADJUSTMENT FOR SIGNED OPERANDS.

3. Description of the Related Art

Digital computers can multiply binary numbers using a process equivalent to that used in the long hand multiplication of decimal digits.

In such a process, each bit (single digit) of the multiplier is taken by itself and applied against all the bits (digits) of the multiplicand to produce a corresponding partial product. Next, each partial product is shifted according to the power of its multiplier bit. And finally, all the shifted partial products are summed to form a complete product.

The long hand method is generally disadvantageous in computer applications because an undesirably large amount of computer circuitry and/or time is typically required to carry out multiplications involving large numbers.

As the number of bits in the multiplier and multiplicand increase, the number of partial products increase. The size of each partial product also increases. Consequently, the total number of bits to be processed in the partial product summation step increases.

Because some amount of computer circuitry and time is required for processing each bit of each partial product, the total amount of processing time and/or the overall size of the computer circuitry used to carry out multiplications by the long hand method tends to become disadvantageously large.

A number of techniques have been developed in the past for reducing this disadvantageous trend.

The Booth algorithm is a well known example. It reduces the number of partial products generated during multiplication and thereby reduces the total number of partial product bits.

The operation and advantage of the Booth algorithm can be best understood by way of a simple example.

Consider the multiplication of the number 5 (multiplicand) by the number 7 (multiplier). This may be represented in binary form as 101×111. Using the long hand approach, one moves right to left across the multiplier bits, and produces the following sum of partial products:

(101×001)+(101×010)+(101×100).

It is seen that three partial products are to be generated and summed together to produce the answer.

This of itself is not difficult to do with present day computer technology. One merely needs to provide three memory areas (registers), each with a storage capacity for storing one of the partial products, and to provide a serial or parallel adding unit for summing the contents of the memory areas either serially over time or simultaneously, in parallel.

Consider what happens, however, as the number of bits in the multiplier and multiplicand progressively increase by powers of two. (Consider 101010×111111 as a second problem.) The length of each partial product increases by the same scaling factor and the number of partial products increases by the same scaling factor. The amount of computer circuitry and/or computer time required for carrying out the multiplication using long hand approach increases correspondingly.

The Booth algorithm reduces the total number of partial products by taking advantage of a mathematical property which occurs whenever repetitive strings of ones are found within the multiplier.

Each continuous string of binary ones (e.g., 111) is replaced by the next highest power of two, less one. By way of example, $111 = 1000 - 1$. In decimal terms this is expressed as $7 = 8 - 1$.

For the first given example ($5 \times 7$), the final product is obtained by summing the positive partial product ($101 \times 1000$) with the negative partial product ($101 \times -1$). The number of partial product additions is reduced (from 3 to 2 in the present example) and a savings in computation time or circuit size is realized.

Many variations to the Booth algorithm have been devised over the years.

One common variation is referred to as the "three-bit modified Booth algorithm". The number of partial products created by this method is approximately $(L_M + 1)/2$ where $L_M$ is the number of bits in the multiplier.

The method is summarized with reference to the below TABLES 1 and 2. A dummy zero is appended to the right of the least significant bit in the multiplier and an encoding window is defined for processing the dummy appended multiplier, 3 bits at a time.

The window starts with the rightmost triplet of bits (the dummy plus bits 0 and 1 of the multiplier) and shifts left two positions for each iteration. One bit is shared between two successive iterations, serving as the leftmost window bit in a first iteration and the rightmost window bit in a second iteration. The bit position at the center of the window is considered the active bit position.

For each iteration, the encoding scheme of the below Table-1 is applied. C represents the multiplicand. Each output of the encoding scheme (C×m, where $m = -2, -1, 0, +1$ or $+2$) is deposited in a successively lower row of a summation array with the rightmost bit of the output located in the active bit position of the encoding window.

For negative outputs, a ones complement of C is formed and a "hot carry" bit ("1") is added to an appropriate bit position of a next lower row of the summation array to thereby effectively form a two's complement of C. If the output is $C \times -2$, the one's complement of C is also shifted left one position within its array row.

TABLE-1

| WINDOW INPUTS | OUTPUT |
|---|---|
| 0 0 0 | C × 0 |
| 0 0 1 | C × 1 |
| 0 1 0 | C × 1 |
| 0 1 1 | C × 2 |
| 1 0 0 | C × −2 |
| 1 0 1 | C × −1 |
| 1 1 0 | C × −1 |
| 1 1 1 | C × 0 |

Table-2 shows an example in which the decimal problem 5×12 is carried out by the 3-bit modified Booth algorithm. In Table-2, the binary form of the multiplicand (5), the multiplier (12) and part of the resulting summation array are shown in top to bottom order with bit position numbers 0 to 12 ($C_h$ in hexadecimal notation) and so forth being aligned vertically on top.

TABLE-2

| bit position: | | | | | | C | B | A | 9 | 8 | 7 | 6 | 5 | 4 | 3 | 2 | 1 | 0 | |
|---|---|---|---|---|---|---|---|---|---|---|---|---|---|---|---|---|---|---|---|
| multiplicand: | | | | | | 0 | 0 | 0 | 0 | 0 | 0 | 0 | 0 | 0 | 0 | 1 | 0 | 1 | |
| multiplier: | | | | | x | 0 | 0 | 0 | 0 | 0 | 0 | 0 | 0 | 0 | 1 | 1 | 0 | 0 | (o) |
| C × 0 → | | | | | | 0 | 0 | 0 | 0 | 0 | 0 | 0 | 0 | 0 | 0 | 0 | 0 | 0 | pp1 |
| C × −1 → | | | 1 | 1 | 1 | 1 | 1 | 1 | 1 | 1 | 1 | 1 | 1 | 1 | 0 | 1 | 0 | | pp2 |
| C × +1 → | 0 | 0 | 0 | 0 | 0 | 0 | 0 | 0 | 0 | 0 | 0 | 0 | 0 | 1 | 0 | 1 | (1) | | pp3 |
| . . | 0 | 0 | 0 | 0 | 0 | 0 | 0 | 0 | 0 | 0 | 0 | 0 | 0 | 0 | | | | | pp4 |
| . . . | | | | | | | | | | | | | | | | | | | ... |
| . . | 0 | 0 | 0 | 0 | 0 | 0 | 0 | 0 | 0 | 0 | 0 | 0 | 0 | 0 | 1 | 1 | 1 | 0 0 | sum |

The multiplicand and multiplier fields are each 16 bits long here. Although not shown, it is to be understood that the length of the sum field ($L_S$) is equal to that of the multiplier ($L_M$) plus that of the multiplicand ($L_C$). So, $L_S=32$ bits in the illustrated case. The sum field extends from the rightmost bit position 0 to the leftmost bit position 31 ($1F_h$ in hexadecimal notation).

The dummy zero is shown to the right of bit position 0 in the multiplier row. Partial product rows are respectively labelled pp1, pp2, pp3, etc.

Let N represent the number of partial products. N is approximately equal to ($L_M$1)/2 which, in the above example becomes $(16+1)/2=9$.

If all the partial product rows, pp1, pp2, ..., ppN had been written out in the above Table-2, it would be seen that the shape of the summation array turns out to be roughly trapezoidal (if one ignores the details of a staircase border at the right side of the array).

The top and bottom sides of the trapezoidal-shaped array are parallel to one another. The right side of the trapezoidal shape slopes to the left as one moves in the top to bottom direction. The left side of the trapezoidal shape extends vertically.

More specifically, the right side of each successive partial-product row (pp1, pp2, pp3, etc.) aligns two positions to the left of a previous row, thereby creating a leftward sloping staircase border at the right side of the trapezoidal shape. The left side of each successive partial-product row (pp1, pp2, pp3, etc.) extends to and aligns vertically with the leftmost bit position of the total sum field (position 31) because sign-extension bits have to be provided in each row to take care of carry bits, as will be explained in more detail shortly.

The top side of the trapezoid is equal in length to that of the sum field ($L_S$) located just below the base of the trapezoid. The base of the trapezoid is roughly half as long as the sum field.

The height of the trapezoidal shape is equal to N, which is the total number of rows (pp1, pp2, ..., ppN) in the summation array. As explained earlier, N is approximately equal to one-half the number of bits in the multiplier plus one divided by two ($N=[L_M+1]/2$). N can vary slightly around this norm depending on the modulo-3 value of the multiplier bit length, $L_M$.

For $L_M=L_C=L_S/2$, the total number of bits in the created when the encoding window covers the dummy zero (c) plus multiplier bit positions 0 and 1. The value of the encoding output, C×0 is written across partial product row pp1 with the least significant bit aligned most significant bit of the C×0 encoding output is written into bit position 15 ($F_h$ in hex notation) of row pp1. However, because the sum line is 32 bits long, a string of sixteen "sign-extension" bits have to be further written into bit positions 16−31 of row pp1.

The encoding output written into the next lower row, pp2, is C× −1 since the window covers multiplier bits 3, 2 and 1 (input pattern 110) for that row. To form a negative version of C, the ones complement of C is written across the pp2 row with the hot carry set in bit position 2 of next lower row pp3 as indicated by the symbol "(1)".

Note that the value, C× −1 can be written across just sixteen bit positions (2 through 17) of row pp2, but sign extension bits have to be filled in across the of row pp2, from bit position 18 through bit position 31.

Row pp3 is further filled with C×1 as the 3-bit encoding window covers bit positions 5, 4 and 3 (input pattern 001).

For remaining operations of the encoding window on the more leftward parts of the multiplier (00...01100), the output is always zero as illustrated in the fourth row, pp4, and indicated to continue into the remaining rows (pp5, pp6,..., ppN) below it.

It is to be noted that although the length $L_C$ of the multiplicand, C, is only 16 bits, and its corresponding partial product C×m is therefore only 16 or 17 bits long (depending on whether m is a +/−2 or not), the sign extension bits have to be replicated from the leftmost position of each partial product C×m (where $m=-2, -1, 0, 1,$ or $2$), to the leftmost bit position of the sum field (bit position 31) to assure that proper summation takes place.

The sign extension bits are all ones ("111...") if the C×m output is negative and all zeroes ("000...") if the C×m output is positive.

A variety of software and/or hardware techniques may be used for writing all the sign extension bits into the sign-extension bit positions of each row, pp1, pp2, ..., ppN. A variety of software or hardware techniques may also be used for carrying out the partial product generation and summation operations of the modified Booth algorithm. Partial product summation can be carried out either as one massively parallel operation or as a few less massively-parallel operations or as a sequential series of smaller operations whose final effect is to produce the sum field (the complete product).

Regardless of the technique chosen (software versus hardware, parallel versus serial), a common problem develops as one attempts to scale upwardly from 16-bit by 16-bit multiplication operations, to 32×32 bit operations, to 64×64 operations, and so forth.

The amount of circuitry and/or time needed for writing the sign-extension bits into each row grows with scaling. The overall size of the summation array (pp1, . . . , ppN) grows in both height and width at a rate proportional to the scaling factor. The cost for preparing the sign extension bits and processing the numbers within the summation array, as measured in terms of either hardware resources (e.g., number of logic gates) or time for completion, grows in proportion to the area of the summation array.

Since area is a function of height times width, and these parameters respectively grow in rough proportion to the number of bits in the multiplier, costs increase as the square of the multiplier field length.

More specifically, for the case where there are $L_M$ bits in each of the multiplier and multiplicand, the area of the trapezoidal-shaped summation array is approximately 0.75 times $(L_M^2 + L_M)$ and the cost for implementing such an array is proportional to this scaling factor.

Despite the speed and circuit size savings obtained from use of the 3-bit modified Booth algorithm, hardware and/or software costs nonetheless become prohibitively large as one tries to construct multipliers with larger and larger multiplier fields. A method for further reducing costs is needed.

SUMMARY OF THE INVENTION

The invention reduces the above-mentioned problem by providing an improved method and apparatus for processing the sign-extension bits of partial-products generated by the modified Booth algorithm or like algorithms which generate signed partial products.

Rather than extending the left side of each partial product row to align with the leftmost bit position of the sum field (e.g., the full product field), the length of each partial product row is preferably held equal to that of the multiplicand (not counting one additional left-side bit position for handling times-two operations and a further right-side bit position for handling hot carries if needed). A special sign-extension "correction" row of the same length is introduced at the bottom of the resulting, parallelogram-shaped, summation array for generating a correction factor which mimics the effect of summing the sign-extension bits in the eliminated portions of each of the partial product rows.

The special correction row contains fewer bits than the total number of bits contained in all the eliminated sign extension portions, and accordingly, less computer circuitry and/or computer time is required for performing the partial product summation operation.

More importantly, the size of the computer circuitry and/or the amount of time needed for generating the correction row can be made smaller than that needed for summing the eliminated sign extension fields. An overall improvement in cost versus performance is obtained.

A fast and simple apparatus or method for generating the correction row is disclosed below.

BRIEF DESCRIPTION OF THE DRAWINGS

The below detailed description makes reference to the accompanying drawings, in which.

DETAILED DESCRIPTION

In the explanation below, the part of each prior art partial product row which was not filled with sign extension bits will be called the "nonextension subfield" and the other part which was filled with extension bits will be called the "sign-extension subfield". The most significant bit of each nonextension subfield is referred to as the sign bit of the partial product.

Figure 1:
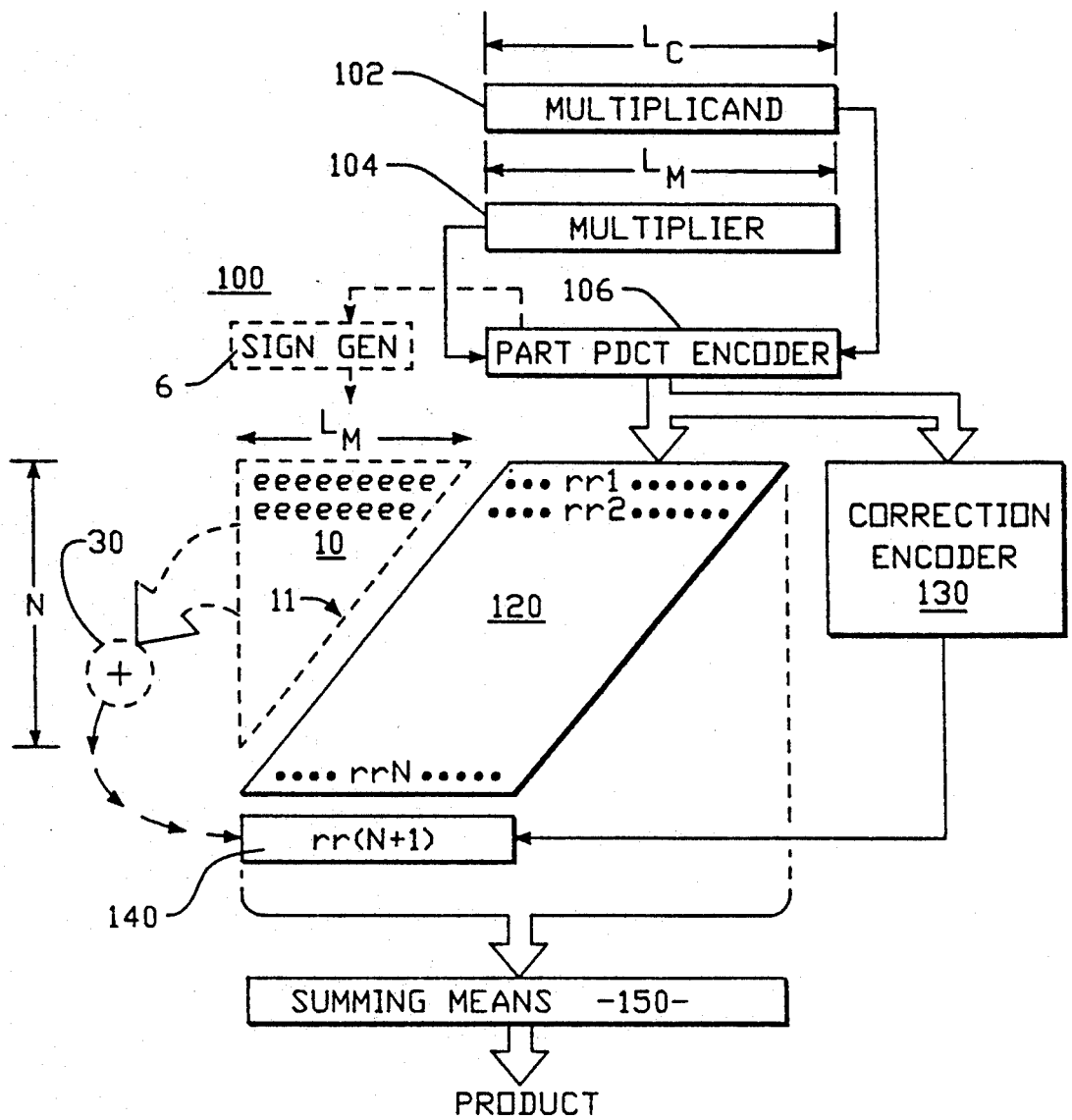
FIG. 1 is a block diagram showing how the area of a partial product summation array is reduced in accordance with the invention.

FIG. 1 shows a multiplication system 100 in accordance with invention. Elements within system 100 are referenced by numbers in the "100"series. A "ghost" section comprising non-existing elements 6, 10 and 30 is additionally shown to illustrate the savings over prior art multiplying schemes.

In the illustrated system 100, a multiplicand register 102 of length $L_C$ and a multiplier register 104 of length $L_M = L_C$ supply respective multiplicand (C) and multiplier (M) bits to a partial product encoder 106.

Encoder 106 receives the values held in registers 102 and 104, and in response, outputs partial product bits to fill summation array 120.

Summation array 120 consists of N register rows each having capacity for storing at least $L_C$ bits. The register rows of array 120 are respectively labelled rr1 through rrN.

In one embodiment, encoder 106 encodes partial products according to a 3-bit modified Booth algorithm. In another, less preferred embodiment, encoder 106 encodes partial products according to the long hand method.

Of importance, partial product encoder 106 does not generate sign extension subfields. The nongenerated sign extension subfields are represented by horizontal series of lower case e's in ghost triangular area 10. Each ghost subfield, eee . . . eee, corresponds to one of the partial products stored in summation array 120. The nonexistent circuitry or computer time that would have been used for generating the ghost subfields of area 10 is represented by a ghost sign-generator 6.

A correction-row encoder 130 receives some of the outputs from the partial product encoder 106 and generates bits for a sign correction row 140 which is appended to the summation array 120, as shown. The bits in the correction row 140 are equivalent to the sum of the bits in the ghost sign-extension area 10 as indicated by ghost adder 30.

Of importance, the circuitry for implementing correction encoder 130 and correction row 140 is smaller in size and/or faster in speed than the sign-generating means 6 that would have been needed to generate the sign extension bits of ghost area 10 and the storage circuitry 10 that would have been needed to store those bits and the summing means 30 that would have been needed to sum the contents of ghost area 10.

Summing means 150 sums only the bits of array 120 and of correction row 140 to produce a complete product.

The overall multiplication system 100 is smaller in size and/or faster in speed than would have been possible with the conventional approach because summing means 150 does not include ghost summing means 30, because correction row 140 stores less bits than ghost area 10, because encoder means 106 does not include generator means 6, and because encoder means 130 is relatively simple, as will be seen shortly.

Basic to the invention is a realization that the sign-extension subfields in the prior art summation array, when taken as a whole, have the over-all shape of a right triangle as denoted by the "ghost" triangle 10 in FIG. 1. The right edge 11 of the ghost triangle 10 slopes to the left by at least one bit position per row as one moves down the rows rr1, rr2, . . . , rrN of the adjacent summary array 120.

A special arithmetic is developed below to take advantage of this geometric characteristic. A correction row which is equivalent to the sum of the sign-extension subfields in the ghost triangle 10 is generated using a relatively simple hardware and/or software means 130.

The correction row 140 is substituted for the previous sign-extension subfields of the ghost triangle 10 and a corresponding saving in circuit size and/or processing time is realized within the summing means 150 which processes the data.

It is easiest to appreciate the invention by developing it out of series of simple modifications.

Consider first the two rows of binary coded numbers which are illustrated in the below DIAGRAM-1. The rows are referenced as rows rr1 and rr2. The numbers in rows rr1 and rr2 are to be summed together to produce a total value in a total row, rrT placed below a bottom line.

DIAGRAM-1

```
         PPPPPPPPPPPPPPPP    rr1
eeeeeeeeeNNNNNNNNNNNNNNN    rr2
sssssssssss s s s s s s s s s s s s s s    rrT
```

The second row, rr2, contains a negative number whose nonextension bits are denoted by NNN . . . NNN and a sign-extension subfield whose bits are denoted by eee . . . eee. It is understood that the sign bit (the leftmost "N") in the nonextension subfield is a "1" and the bits of the sign-extension subfield (eee . . . eee) are also ones.

The upper row, rr1, contains a positive number whose nonextension bits are denoted by PPP . . . PPP. There is no sign extension subfield for the upper row, rr1.

The string of lower-case s's placed below the bottom line represent the sum of the numbers in rows rr1 and rr2. The sum sss . . . sss can be positive or negative, depending on the relative magnitudes of the numbers in rows rr1 and rr2.

Consider first what happens if the absolute value of the negative number in row rr2 is less than the magnitude of the positive number in row rr1. The result in total row rrT will be positive as illustrated in the below DIAGRAM-2.

DIAGRAM-2

```
                 (c)
         PPPPPPPPPPPPPPPP    rr1
  1111111111NNNNNNNNNNNNNNN    rr2
  0000000000s s s s s s s s s s s s s s    rrT
```

The sign extension subfield of row rr2 is now shown in more detail as consisting of all ones (111 . . . 111). The sign bit in the nonextension subfield of row rr2 is still shown as "N" to differentiate it from the "1's" of the sign-extension subfield. The bit positions in total row rrT which correspond to the sign-extension bits of row rr2 are all zeroes (000 . . . 000).

How do the sign extension bits of total row rrT become all zeroes when the bits in the sigh-extension subfield of second row rr2 are all ones? The answer is that a carry bit equal to one, (c)=1, develops in the bit position just to the left of the nonextension subfields when the subfields, (PPP . . . PPP) and (NNN . . . NNN) are summed together.

This carry bit (c) can be visualized as dropping onto the rightmost "1" bit in the sign extension subfield of row rr2, and in so doing, initiating two simultaneous functions. It erases the string of "1's" by carry propagation and thus blocks the sign-extension subfield of row rr2 from dropping down to the bottom line, rrT. It also annihilates itself by combining with the rightmost one of the sign extension subfield and thereby blocks its own value (c=1) from dropping down to the bottom line, rrT.

Suppose for a moment that the sign extension subfield of row rr2 were to be removed from DIAGRAM-2. The carry bit (c) would drop into the sum field sss . . . sss and produce an erroneous result.

With the sign extension subfield present in row rr2, however, the ensuing carry propagation sweeps the carry bit (c) leftward, away from the sum field sss . . . sss and into oblivion. The sign extension subfield thus functions to block the carry bit (c) from erroneously dropping down to the bottom line.

Now consider what happens when the absolute value of the negative number in row rr2 is greater than the magnitude of the positive number in row rr1. The result in total row rrT is negative as illustrated in the below DIAGRAM-3.

DIAGRAM-3

```
                 ( )
         PPPPPPPPPPPPPPPP    rr1
  1111111111NNNNNNNNNNNNNNN    rr2
  1111111111s s s s s s s s s s s s s s    rrT
```

The sign extension subfield of row rr2 is again shown as consisting of all ones (111 . . . 111). The corresponding bit positions in the total row, rrT, are now also all ones (111 . . . 111).

This happens because the sum of the nonextension subfields, (PPP . . . PPP) and (NNN . . . NNN), fails to produce a carry bit as indicated by the empty parentheses to the left of and above first row rr1 of DIAGRAM-3. All the ones of the sign extension subfield in row rr2 drop down into the bottom line to thereby define a negative result.

Next, consider a modified summation array as illustrated in below DIAGRAM-4.

DIAGRAM-4

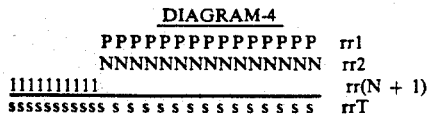

The sign-extension subfield (eee ... eee) of second row rr2 has been eliminated and a new "sign-correction" row rr(N+1) has been inserted. It is positioned below rows rr1 and rr2 but above the bottom line.

The bits of the sign-correction row rr(N+1) are all ones (111...111), and therefore substitute for the eliminated sign-extension subfield (eee...eee) of the second row rr2. The blank positions at the right side of the sign-correction row rr(N+1) do not contribute to the bottom line sum (sss...sss).

The sum (sss...sss) that is obtained from summing the three rows, rr1, rr2 and rr(N+1) of DIAGRAM-4, is, of course, equivalent to the result obtained from summing rows rr1 and rr2 in either DIAGRAM-2 or DIAGRAM-3.

When the sum of the nonextension subfields (PPP...PPP) and (NNN...NNN) in rows rr1 and rr2 of DIAGRAM-4 produce a carry bit, the carry bit will annihilate the ones in the sign-correction row rr(N+1) and the ones in the sign-correction row rr(N+1) will correspondingly annihilate the carry bit so that a positive result drops down to the total row, rrT. If the sum of the nonextension subfields (PPP...PPP) and (NNN...NNN) in rows rr1 and rr2 do not produce a carry bit, the ones of the sign-correction row rr(N+1) will drop down to the total row, rrT, thereby defining a negative result.

From a purely mathematical standpoint, DIAGRAM-4 is equivalent to DIAGRAMS 1-3. From the viewpoint of physical circuitry, however, DIAGRAM-4 suggests a rather unusual concept.

The memory area (or register or bus or combinatorial logic unit) which stores or carries the negative number (NNN...NNN) is reduced in size (width) because it no longer supports the sign extension bits for that number NNN...NNN. A separate memory area (or register or bus or combinatorial logic unit) is at the same time added to store (or propagate) a correction factor whose contents are applicable to the entire summation array (to rows rr1 and rr2).

With this in mind, we advance to a next modification, and insert a new row, rr3, between rows rr2 and rr(N+1), as shown in the below DIAGRAM-5.

DIAGRAM-5

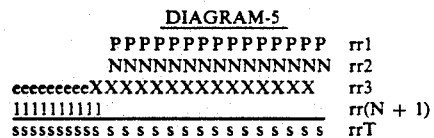

The sign-extension subfield (eee...eee) of the newly added, third row rr3 is not defined yet as being either all ones or all zeroes. Of importance, however, the rightmost bit of the new sign extension subfield (eee...eee) is positioned at least one bit position to the left of the corresponding rightmost bit in the eliminated sign-extension subfield previously associated with row rr2. The nonextension subfield of third row rr3 is denoted by a series of X's to indicate that it could represent either a positive or negative number.

Assume that the third row rr3 contains a negative number. If we eliminate the sign-extension subfield (eee...eee) of row rr3 and add a corresponding set of ones to the sign-correction row rr(N+1), the result will appear as shown in DIAGRAM-6.

DIAGRAM-6

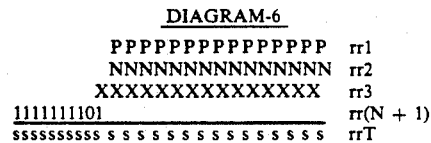

Note that the second to right bit position of the sign-correction subfield has been toggled to the zero This is in accordance with a simple rule of binary addition. As seen in the below DIAGRAM-7, whenever two strings of all ones are added, the rightmost "1" in the leftward indexed extension subfield toggles the corresponding bit in the sum row while leaving the remaining bits of the sum row as all ones.

DIAGRAM-7

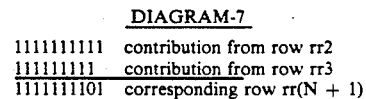

Going back to DIAGRAM-5, if we assume that the newly inserted third row rr3 contains a positive number, the contribution to the sign-correction row rr(N+1) from the third row rr3 will be all zeroes and the second from the right bit of the sign-correction subfield will remain as a one ("1") in such a case.

Let us assume for our next modification that the third row rr3 definitely contains a positive number and that we now wish to expand the summation array by inserting yet a fourth row rr4 as shown in the below DIAGRAM-8.

DIAGRAM-8

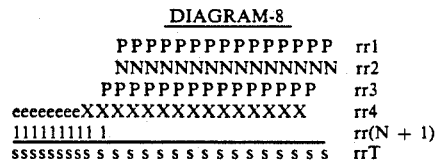

As was the case with our previous expansion, the sign-extension subfield (eee...eee) of the newly added fourth row rr4 is not defined yet to be either all ones or all zeroes. But of importance, the rightmost bit of the new subfield (eee...eee) is positioned at least one bit position to the left of the corresponding rightmost bit in the eliminated sign-extension subfield previously associated with the third row rr3. The nonextension subfield of row rr4 is denoted by a series of X's to indicate that it could represent either a positive or a negative number.

Let us now assume that the fourth row rr4 contains a negative number. If we eliminate the sign-extension subfield (eee...eee) of row rr4 and add a corresponding set of ones to the sign-correction row rr(N+1), the result will appear as shown in DIAGRAM-9.

DIAGRAM-9

```
    PPPPPPPPPPPPPPP        rr1
    NNNNNNNNNNNNNNN        rr2
    PPPPPPPPPPPPPPP        rr3
    XXXXXXXXXXXXXXX        rr4
    111111101 1            rr(N + 1)
    ssssssss s s s s s s s s s s s s s s s   rrT
```

Note that a zero has been inserted into the third from the right bit position of the sign-correction subfield rr(N+1). If third row rr3 of above DIAGRAM-9 had also contained a negative number (instead of a positive number), the result in the sign-correction row rr(N+1) would have been 111111001. That is, zeroes would have been overwritten into the bit positions of correction row rr(N+1) that correspond to rows rr3 and rr4.

Strangely, the rightmost bit of rr(N+1) contains a "1" even though its corresponding partial product rr2 is negative.

If we were to discount this strange phenomenon and we continued the above sequence by adding rows of rr5 through rrN, a simple method for generating the sign-correction row rr(N+1) would begin to reveal itself. Simply toggle the corresponding "one" in the correction row for each corresponding negative number.

But, there is that troublesome exception at the right end of row rr(N+1). One additional step is called for to better understand what is going on here. Add a zero bit ("0") to the right of the rightmost one bit in row rr(N+1) and assign that zero bit as corresponding to the positive number (PPP ... PPP) in row rr1. The following "1" bit of row rr(N+1) then corresponds to row rr2, the third from the right bit corresponds to row rr3, and so on.

We can then present the following rule. For any summation array having partial product rows rr1 through rrN, where the left end of each nonextension subfield successively indexes one bit position to the left of a previous row, the correction-row generating method comprises the steps of:

(1) Point to the topmost row, rr1, of the summation array and to the rightmost bit position of the sign-correction row, rr(N+1);

(2) Does the pointed-to row contain a negative number? If the answer is yes, proceed to step number (5). If the answer is NO, write a zero into the pointed-to bit position of the sign-correction row rr(N+1);

(3) Point to the next partial product row and also point to the next bit position of the sign-correction row, rr(N+1);

(4) Repeat step numbers (2) and (3) either until the answer is yes or until there are no more partial product rows.

(5) Write a one into the sign-correction row rr(N+1) bit position corresponding to the first found partial product row having a negative number and proceed to step number (6).

(6) Point to the next partial product row. Point to the next bit position of the sign-correction row, rr(N+1). Does the pointed-to row contain a negative number? If YES, write a zero into the pointed-to bit position of the sign-correction row rr(N+1); otherwise write a one into the same bit position. Repeat this step number (6) until there are no more partial product rows.

As seen from the above method, the right side bits of the correction row remain zero for each of the corresponding positive numbers in the upper rows as long as there are no negative partial products in the corresponding upper rows of the summation array. The first negative number gets a one ("1") in its corresponding bit position of the correction row. Thereafter, the rule is inverted. Each negative number gets a zero ("0") and each positive number gets a one ("1").

Another way of looking at the same phenomenon is to stand in the position of each bit in the sign-correction row rr(N+1) and to look up to the overlaying partial product rows. We can then define the following process:

(1) For each correction bit CB(i); in row rr(N+1), point to its corresponding row, rr(i), in the summation array.

(2) Does the pointed-to row rr(i) or any row rr(i-j) above it (for j equal 1 to i-1) contain a negative number? If NO, set CB(i) equal to zero.

(3) Does the pointed-to row rr(i) contain a negative number while all other rows rr(i-j) above it contain positive numbers? If YES, set CB(i) equal to one.

(4) Does the pointed-to row rr(i) contain a negative number while one or more rows rr(i-j) above it also contain negative numbers? If YES, set CB(i) equal to zero.

(5) Does the pointed-to row rr(i) contain a positive number while one or more rows rr(i-j) above it contains a negative number? If YES, set CB(i) equal to one.

The above rules can be converted into a truth table as shown in below DIAGRAM-10. Input logic values are shown in columns A and B. Output logic values are shown in column C.

| DIAGRAM-10 | | |
|---|---|---|
| INPUTS | | OUTPUT |
| A | B | C |
| $Sr(i) =$ sign bit of row rr(i) | Does $Sr(j) = 1$ in any row rr(j) above row rr(i) ? | Corresponding Correction Bit CB(i) |
| 0 | 0 | 0 (rule 2) |
| 0 | 1 | 1 (rule 5) |
| 1 | 0 | 1 (rule 3) |
| 1 | 1 | 0 (rule 4) |

Note that for the case of (i)=1, there are no situations where the answer to the column-B question, $Sr(j)=1$ ? is true because there are no rows above row(i=1). Therefore, for the case of (i)=1, input conditions AB=01 and AB=11 of the above truth table are don't-care conditions; they never happen. The truth table reduces to one having just the input conditions AB=00 and AB=10 for this special case.

Figure 2:
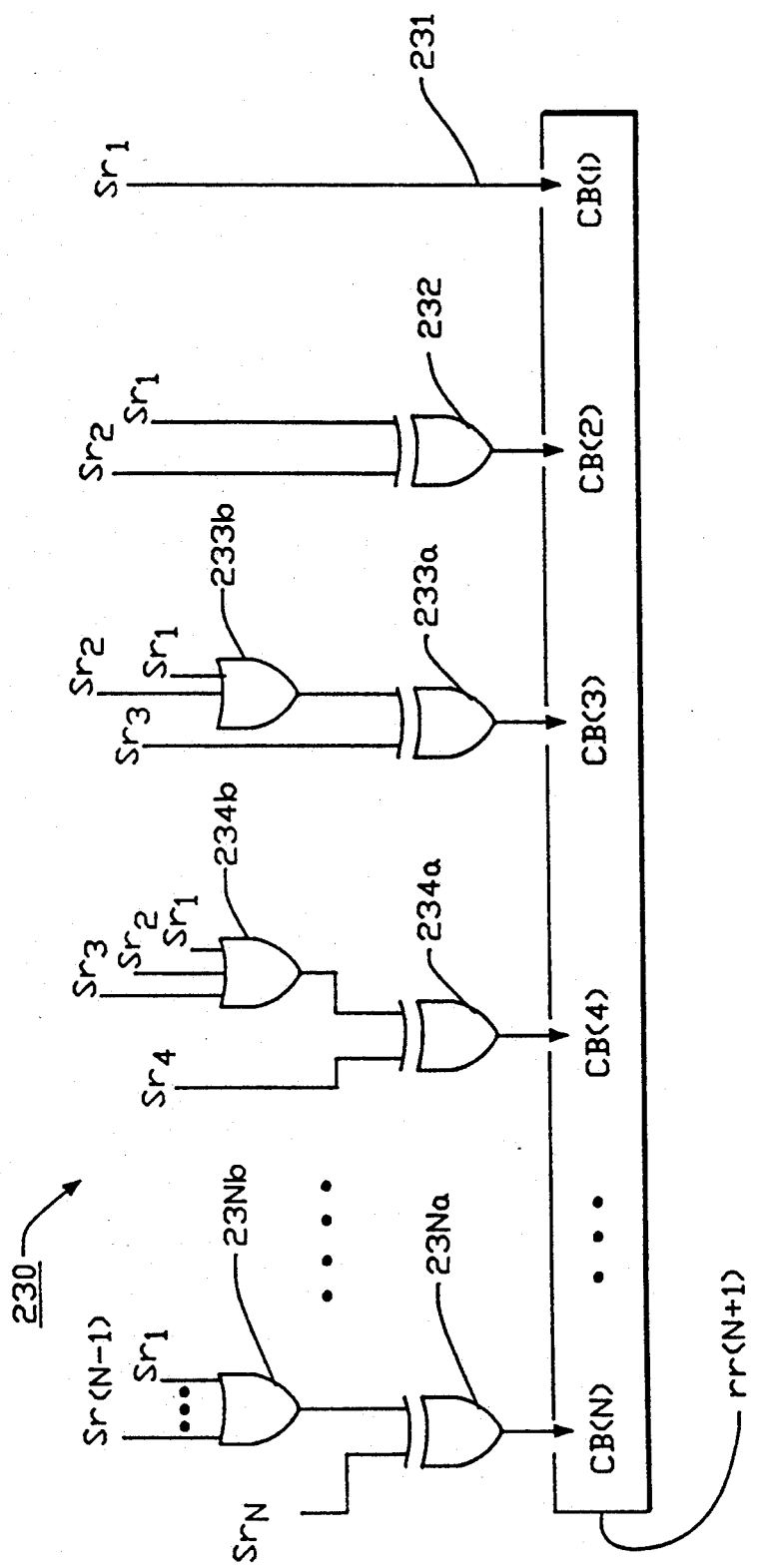
FIG. 2 is a schematic diagram of a first correction row encoder in accordance with the invention.

FIG. 2 is a schematic of a simple encoder circuit 230 which may be used for carrying out the input/output translation defined by DIAGRAM-10.

Sr1 represents the leftmost "sign bit" of row rr1. Sr2 is the sign bit of row rr2, and so on. SrN, therefore represents the leftmost "sign bit" of row rrN.

Correction bit CB(1) is simply a copy of Sr1, as indicated at 231. This can be done because of the above-mentioned don't-care condition for the case of (i)=1.

For the case of correction bit CB(2), an exclusive OR of the two left input columns, A and B, in above DIAGRAM 10 produces the result shown in output column-C. A simple XOR gate generates correction bit CB(2) as shown at 232.

For the case of CB(i) where i>2, the answer to the question of column-B is produced by ORring together the sign bits of previous rows, as indicated, for example, at 233b, 234b and 23Nb. Then, the result in column-C is produced by exclusive-ORring the column B answer with the sign bit for the current row (i) as indicated, for example, at 233a, 234a and 23Na.

The general case encoder circuit for producing correction bit CB(N) is shown to comprise OR gate 23Nb which receives as its inputs, Sr1, Sr2, ..., Sr(N−1). The output of OR gate 23Nb drives a first input of XOR gate 23Na while the second input of the XOR gate receives sign bit SrN. An advantage of having separate OR gates 233b, 234b, 23Nb for producing each column-b answer is that the corresponding bits CB(3), CB(4), CB(N) of the correction row are all generated in parallel and this speeds the overall production of not only the correction row bits, but also the final product (the output of summing means 150 in FIG. 1).

With the above principles in mind, we need to take a closer look at the structure of the summation array created by a 3-bit modified Booth algorithm. The general structure is illustrated in below DIAGRAM 11.

bits to a corresponding pair of bit positions in the correction row.

The rightmost two bits, "00", of row EE1 drop down along the columns of bit positions A and 9 to define the corresponding bit positions A and 9 of the correction row. The rightmost two bits, "11", of row EE2 drop down along bit positions C and B. The rightmost two bits, "00", of row EE3 drop down along the columns of bit positions E and D. The rightmost two bits, "10", of row EE4 drop down along bit positions G and F. The rightmost two bits, "00", of row EE5 drop down along the columns of bit positions I and H.

This occurs because the window of the three-bit modified Booth algorithm shifts by two places on every iteration and thereby shifts the right end of each successive partial product C×m(i) two bit positions to the left of the preceding partial product.

Note, however, that in row pp4 the multiplier m(4) is equal to minus two (−2). This shifts the left end of the nonextension subfield (NNNNNNNNN0) one addi-

DIAGRAM-11

| Alt BP ID: | 5 | | 4 | | 3 | | 2 | | 1 | | | | | | | | | | | |
|---|---|---|---|---|---|---|---|---|---|---|---|---|---|---|---|---|---|---|---|---|
| | b | a | b | a | b | a | b | a | b | a | | | | | | | | | | |
| Bit Position: | I | H | G | F | E | D | C | B | A | 9 | 8 | 7 | 6 | 5 | 4 | 3 | 2 | 1 | 0 | . |
| ROW NAME | . | . | . | . | . | . | . | . | . | . | . | . | . | . | . | . | . | . | . | . |
| C × +1 → | . | . | . | . | . | . | . | . | . | P | P | P | P | P | P | P | P | P | . | pp1 |
| C × −1 → | . | . | . | . | . | . | . | N | N | N | N | N | N | N | N | N | . | . | . | pp2 |
| C × +1 → | . | . | . | . | . | . | P | P | P | P | P | P | P | P | P | . | . | . | . | pp3 |
| C × −2 → | . | . | . | N | N | N | N | N | N | N | N | N | O | . | . | . | . | . | . | pp4 |
| C × +1 → | . | . | P | P | P | P | P | P | P | P | . | . | . | . | . | . | . | . | . | pp5 |
| EE1 → | 0 | 0 | 0 | 0 | 0 | 0 | 0 | 0 | 0 | 0 | . | . | . | . | . | . | . | . | . | . |
| EE2 → | 1 | 1 | 1 | 1 | 1 | 1 | 1 | 1 | . | . | . | . | . | . | . | . | . | . | . | . |
| EE3 → | 0 | 0 | 0 | 0 | 0 | 0 | . | . | . | . | . | . | . | . | . | . | . | . | . | . |
| EE4 → | 1 | 1 | 1 | 0 | . | . | . | . | . | . | . | . | . | . | . | . | . | . | . | . |
| EE5 → | 0 | 0 | . | . | . | . | . | . | . | . | . | . | . | . | . | . | . | . | . | . |

The topmost two rows are referenced as "alternate bit positions identifiers" (Alt BP ID) for reasons that will become apparent shortly. The corresponding, more traditional bit position designations: 0, 1, 2, ..., 9 and A, B, ..., F are shown two rows lower with positions to the left of hexadecimal F, being labelled G, H and I for convenience sake.

Shown below this are the bits of the partial product rows, pp1, pp2, pp3, pp4 and pp5.

The Booth algorithm operations which generate the bits of rows pp1, pp2, etc., are respectively illustrated as C×+1→, C×−1→, and so on at the left side of each partial product row. The bits within each nonextension subfield (with the exception of the rightmost bit in row pp4) are respectively designated as P or N depending on whether a positive or negative result is produced by the corresponding Booth operation, C×m(i), where m(i) is the effective multiplier for row pp(i).

Unlike previous diagrams in which the sign extension contributions from all the partial product rows were compressed into a single correction row, the sign extension subfields from partial product rows pp1, pp2, pp5 are initially shown shifted down to respective rows EE1, EE2, ..., EE5. This layout will help explain the arithmetic behind the addition of the EE rows with more clarity. A zero is padded to the right of sign-extension subfield EE4 for reasons that will become apparent shortly.

Ultimately, rows EE1 through EE5 are summed to produce a single sign-correction row rr(N+1). Note, however, that to generate such a correction row, each of rows EE1 through EE5 contributes its rightmost two tional position to the left (into bit position F rather than E) and leaves a zero in bit position 6.

Consequently, the rightmost logic one ("1") of row EE4 is positioned within the left-handed one of corresponding bit positions G and F. At the same time, the rightmost logic one ("1") of row EE2 is positioned in the right-handed one of its corresponding bit positions C and B because its corresponding multiplier, m(2), is equal to minus one (−1).

It is advantageous to switch now to the nomenclature of the alternate BP identifiers.

Bit position 9 is alternatively referred to as bit position (1a). Bit position A is alternatively referred to as bit position (1b). Bit position B is alternatively referred to as bit position (2a). Bit position C is alternatively referred to as bit position (2b). And so on.

Generally speaking, for the case where a negative partial product, (NNNNNNNNN) or (NNNNNNNNN0), arises in a given row pp(i), the rightmost logic one ("1") of the corresponding sign extension subfield row EE(i) will reside either in the left-handed one or right-handed one of alternate bit positions (ib) and (ia) depending on whether the "m(i)" factor in the Booth operation, C×m(i), was a −2 or a −1.

The earlier discussed "toggling effect" which begins in the sign-correction row rr(N+1) after the first negative partial product is encountered, and which is attributed to the "rightmost" logic one ("1") of each negative sign extension subfield, correspondingly shifts into either bit position (ib) or (ia) depending on the value of multiplying factor "m(i)".

Note that multiplying factor "m(i)" cannot be simultaneously equal to −1 or −2 for any given row number, i. These are mutually exclusive states.

Note further that when multiplying factor "m(i)" is equal to either −1 or −2, it cannot be simultaneously equal to 0, or +1 or +2. These are also mutually exclusive conditions for any given row number, i.

In the below DIAGRAM-12, the case of "m(i)" being equal to 0, or +1 or +2 is referred to as a "Class-A condition". The case of "m(i)" being equal to −1 is referred to as a "Class-B condition". The case of "m(i)" being equal to −2 is referred to as a "Class-C condition".

DIAGRAM-12

| INPUTS | | OUTPUTS | |
|---|---|---|---|
| AA Mutually Exclusive Classes of each m(i) | BB Does m(j) of any row pp(j) above row pp(i) belong to Class-B or to Class-C? | CC Corresponding Correction Bits | |
| | | CB(ib) | CB(ia) |
| A  m(i) = 0 or +1 or +2 | 0 1 | 0 1 | 0 1 |
| B  m(i) = −1 | 0 1 | 1 1 | 1 0 |
| C  m(i) = −2 | 0 1 | 1 0 | 0 1 | respectively referenced as "AA", "BB" and "CC". Note that for the case of (i) = 1, there are no situations where the answer to the column-BB question, m(j) not in Class-C? is always true. This is because there are no rows above row(i=1). Therefore, for the case of (i)=1, the above DIAGRAM-12 reduces to one where rows satisfying BB=1 are stripped out.

Comparing DIAGRAM-11 with DIAGRAM-12, it is seen that rows pp1 and EE1 are examples satisfying AA=Class-A and BB=0. The two rightmost bits contributed from row EE1 are therefore CB(ib), CB(ia)=00.

Referring to rows pp2 and EE2 of DIAGRAM-11, it is seen that this is an example of AA=Class-B and BB=0. It is the first time that a negative partial product appears and the multiplier is minus one, therefore the correction contribution is 11.

If the multiplier factor, m(2) for column pp2 had been a minus two instead of a minus one, the contributed bits would have been, as shown for the case of AA=Class-C and BB=0. The contributed correction bits would have been 10.

Referring to row pp3 of DIAGRAM-11, this is an occurrence of a positive partial product coming after the occurrence of a negative partial product. The corresponding sections of DIAGRAM-12 are AA=Class-A and BB=1. The rightmost two zero bits of row EE3 do not toggle the contributions from row EE2, and therefore the resulting correction row bits are 11.

Referring to row pp4 of DIAGRAM-11, this is an example of a second-occurring negative partial product. The logic one ("1") at bit position (4b) of row EE4 toggles the logic one ("1") of row EE2, bit position (4b), and therefore the corresponding correction bits of positions (4b) and (4a) will be 01, as shown in DIAGRAM12, at AA=Class-C for the case of BB=1.

If the multiplying factor, m(4) of row pp4 had been a minus one instead of a minus two, the rightmost logic one ("1") of row EE4 would have been located at bit position (4a) and the corresponding correction bits would have been 10. This is shown in DIAGRAM-12, for the case of AA=Class-B and BB=1.

Figure 3:
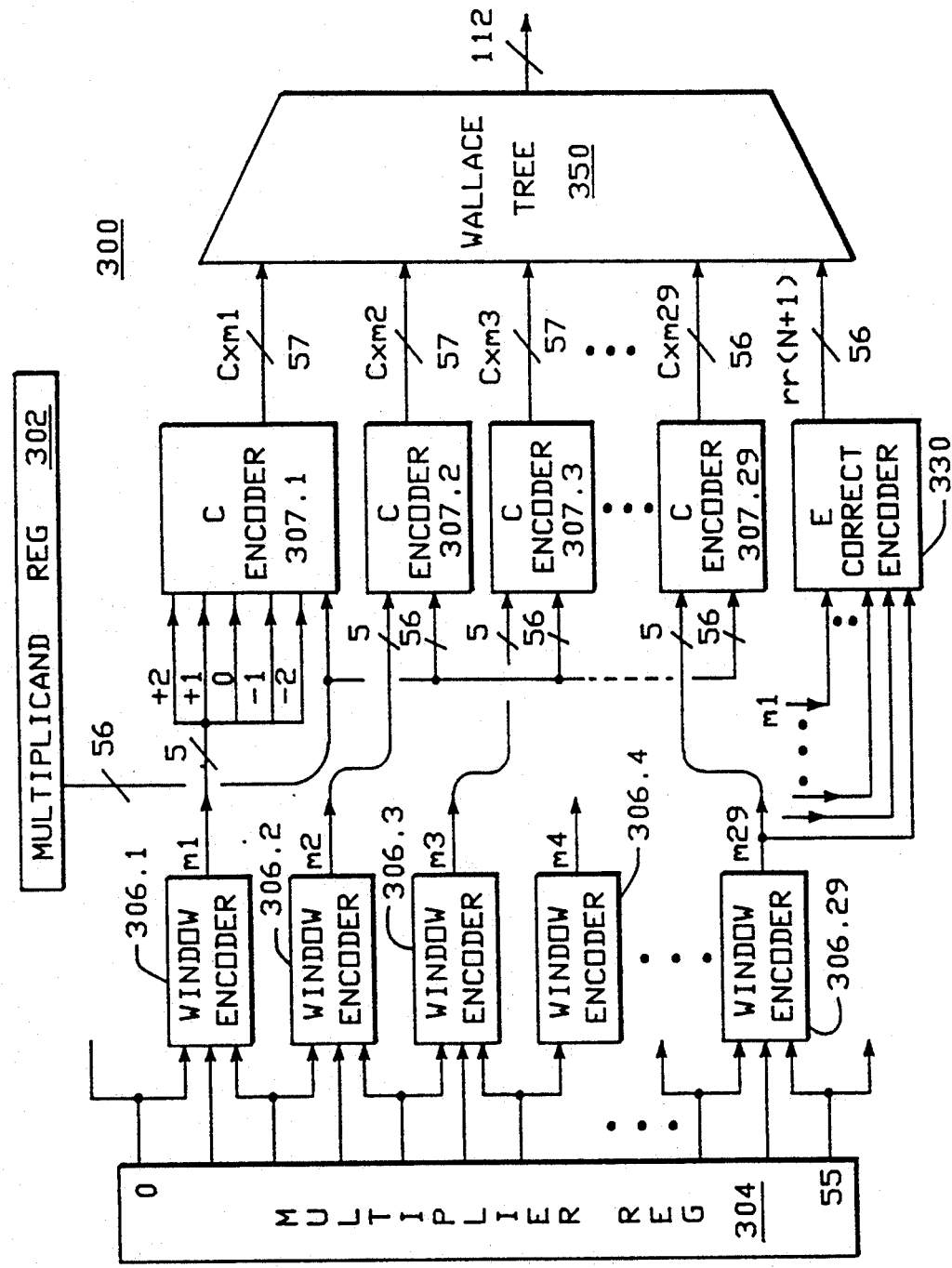
FIG. 3 is a block diagram of a parallel multiplier circuit in accordance with the invention.
Figure 4:
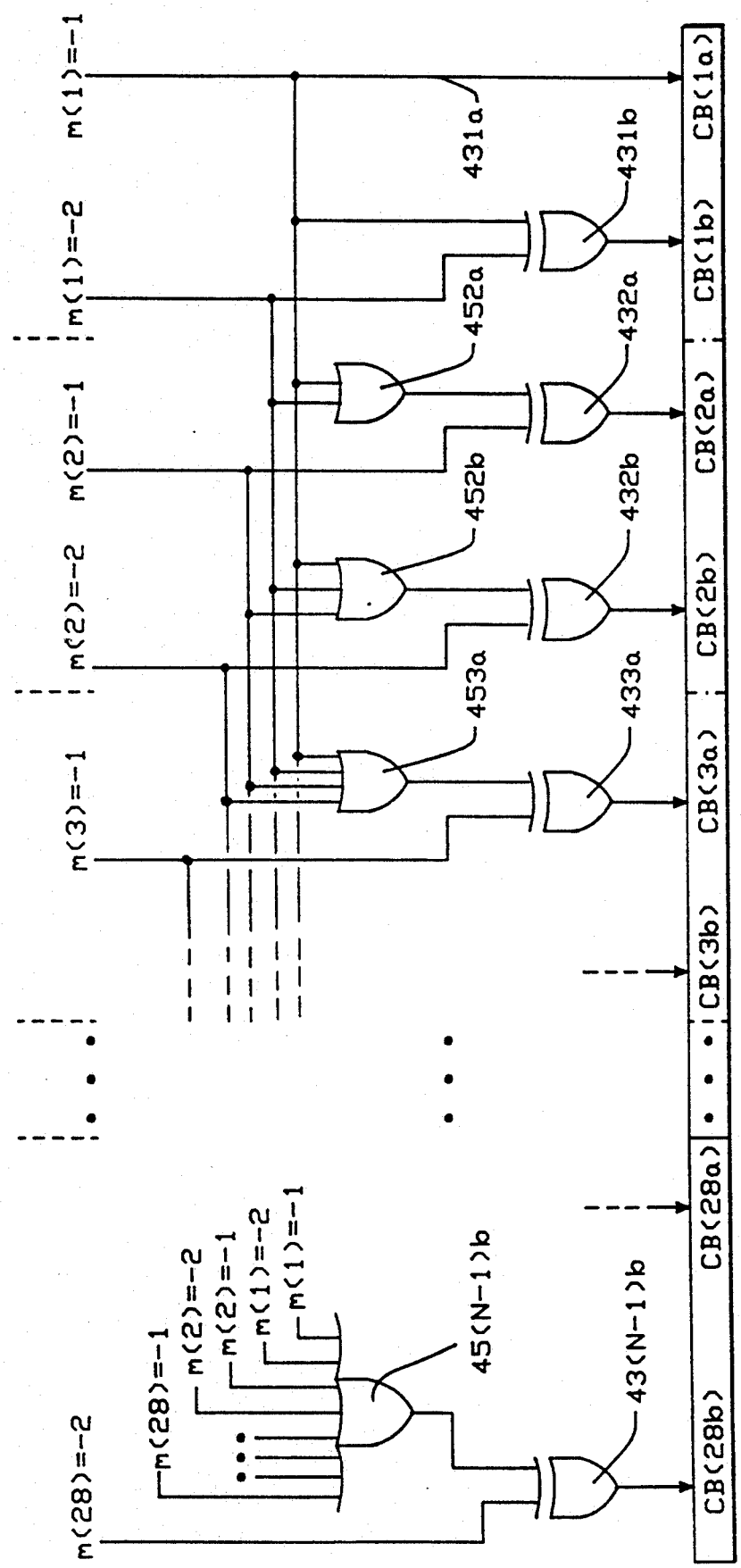
FIG. 4 is a schematic diagram illustrating a circuit for generating the bits of a sign-correction row rr(N+1) for a 3-bit modified Booth algorithm in accordance with the invention.

FIG. 4 illustrates a gate-level schematic of a circuit which carries out the logic operations of DIAGRAM-12. This correction encoder 330 is designed for use within a parallel Booth-algorithm multiplying circuit 300 shown in FIG. 3.

Referring first to FIG. 3, the overall design of the parallel multiplying circuit 300 will be described.

Multiplicand register 302 stores a multiplicand value with as many as fifty-six bits. Multiplier register 304, likewise stores a multiplier value with as many as fifty-six bits. Window encoders 306.1, 306.2, . . . , 306.29 respectively receive triplets of bits 0–55 from multiplier register 304 and encode them in accordance with the three-bit modified booth algorithm. Each window encoder 306.x outputs a corresponding five-bit multiplier value m(x) to indicate whether the multiplicand in register 302 should be correspondingly multiplied by +2, +1, 0, −1 or −2. The five lines for multiplier bus m1 are illustrated and understood to be similarly repeated for multiplier buses m2, m3 . . . , m29.

Each m(x) bus (x=1, 2, 3, . . . 29) feeds into a corresponding C-encoder unit 307.x as shown. The fifty-six bit wide multiplicand value from register 302 is also input into all the C-encoders 307.1–307.29.

Each C-encoder unit 307.x outputs a fifty-seven bit corresponding value C×m(x) to a Wallace tree circuit 350. The last C-encoder unit 307.29 needs no more than fifty-six bits to represent its output C×m(29). Because of the peculiar way in which the window of the three-bit modified Booth-algorithm aligns with the fifty-six-bit multiplicand of register 302, the absolute value of multiplying factor m(29) is never greater than one. Thus, output bus C×m(29) of encoder 307.29 needs only fifty-six wires.

The Wallace tree circuit 350 is well known and does not need to be described in detail here. Briefly, a Wallace tree circuit 350 may be described as having a plurality of layers which successively reduce the number of bits to be added using a three-to-two compression algorithm in each layer.

Each of the m(x) busses also feeds into extension bit correction encoder 330, as shown. The correction row encoder 330 generates its own fifty-six bit wide correction factor CB(1a:28a, 1b:28b) which is also input into the Wallace tree circuit 350.

Referring to FIG. 4, the internal circuit of the correction row encoder 330 will now be described in greater detail.

As already mentioned, for the case of (i)=1, the rows of DIAGRAM-12 corresponding to BB=1 can be stripped out. When this is done, it is seen that correction bit CB(1a) is at logic one ("1") only in the row of Class-B, or put another way, only when multiplying factor m(1)=−1. Thus, correction bit CB(1a) is simply a copy of the logic level appearing on the −1 line of bus m(1) (see FIG. 3). This is shown at 431a of FIG. 4.

Correction bit CB(1b) is at logic one in the Class-B and Class-C rows of the reduced DIAGRAM-12. As seen in FIG. 4, correction bit CB(1b) is generated by an exclusive-OR gate (XOR) 431b. XOR gate 431b receives logic levels representing the truth of the respective propositions, m(1)= −2 and m(1)= −1. Since Class-B and could be replaced by a simple OR gate if desired.

For the case where (i) is greater than one, the full logic of DIAGRAM-12 has to be implemented.

Consider first the output row labeled CB(ia). For Class-A and Class-C, the output CB(ia) is simply a copy of the bits in column BB. For Class-B, the output term CB(ia) are the inverse of the corresponding bits in column BB.

Thus, for the case of (i)=2, OR gate 452a generates the bits of column BB by ORring together all m(j) terms where j is less than i. Exclusive-OR gate (XOR) 432a inverts the result produced by OR gate 452a if m(2)= −1 is true.

Consider next, the output column labelled CB(ib) in DIAGRAM-12. For the case of Class-A, CB(ib) is simply a copy of the bits in column BB. For the case of Class-B, the output correction bit CB(ib) is always logic one regardless of what bits appear in column BB. For the case of Class-C, the output bit CB(ib) is the inverse of the bits appearing in column BB.

Referring to the gates 432b and 452b, it is seen that these generate correction bit CB(2b) in FIG. 4. Assume first that the proposition m(2)= −1 is false. We only have to deal with the conditions of Class-A and Class-C. OR gate 452b generates the bits of column BB (as long as our assumption stands) and exclusive-OR gate (XOR) 432b inverts the result for the case of Class-C.

So what happens for the case of Class-B? Recall that Class-B is mutually exclusive of Class-A and Class-C for any given value of i. For the case of i=2, our assumption regarding the falsehood of m(2)= −1 is correct if m(2) resides in either of Class-A or Class-C. When m(2) resides in Class-B, the value of m(2)= −2 is false by definition (because Class-C is mutually exclusive of Class-B). Accordingly, for the case of m(2)= −1 being true, that true bit passes through OR gate 452a and through XOR gate 432a to hold CB(2a) at logic one ("1") irrespective of the value of BB.

The circuitry for generating correction bit CB(3a) is shown to comprise OR gate 453a and XOR gate 433a. OR gate 453a receives as its inputs the logic levels on lines: m(2)= −2, m(2)= −1, m(1)= −2, and m(1)= −1. XOR gate 433a receives as its inputs, the output of OR gate 453a and the logic level on line m(3)= −1.

The fifty-sixth bit generated by encoder 330 is CB(28b) As seen, OR gate 45(N−1)b collects the logic levels of lines m(1)= −1, m(1)= −2, ..., m(28)= −1. XOR gate 43(N)b receives as its inputs, the output of OR gate 45(N−1)b and the logic level on line m(28)= −2.

Since correction bits CB(1a) through CB(28b) are all generated in parallel from the signals generated on buses m1 through m28 (see FIG. 3), the output from correction encoder 330 becomes valid for processing by the Wallace tree circuit 350 at the same time that the outputs from the C-encoders 307.1-307.29 become valid. This advantageously quickens the speed at which multiplying circuit 300 produces results. Naturally, if speed is not of the essence, the parallel architecture shown in FIG. 3 could be converted partly or wholly into one of a serial nature while still complying with the truth table set forth in DIAGRAM-12. (Note with respect to FIG. 3, that in this particular implementation, the E encoder 330 does not need to receive the m(29) bus since there is no CB (29a) or CB(29b). The E encoder 330 receives only m1-m28.)

The above disclosure is to be taken as illustrative of the invention, not as limiting its scope or spirit. Numerous modifications and variations will become apparent to those skilled in the art after studying the above disclosure.

By way of example, the invention is not limited to systems which carry out long-hand multiplication or multiplication in accordance with the 3-bit modified Booth algorithm. All computational circuits which add signed partial products can benefit. The invention is not limited to circuits which carry out computations in a massively parallel fashion. Serial implementations are equally contemplated. The correction row encoding step does not have to be carried out in hardware. The logic OR and XOR operations of the correction row generating algorithm are simple enough to be quickly carried out in software.

Given the above disclosure of general concepts and specific embodiments, the scope of protection sought is to be defined by the following claims.

What is claimed is:

1. An apparatus receiving binary encoded signals, PP(1), PP(2), ... PP(N), representing a plurality of N signed partial products, pp(1), pp(2), ..., pp(N), where a sign bit Sr(i) of each received partial product signal PP(i) is in essence, unaccompanied by a signal representing a corresponding sign extension subfield eee ... eee, each sign extension subfield signal being one which conventionally would have accompanied a corresponding one of the partial product signals PP(i) for the purpose of producing a signal representing the sum of the signed partial products, said apparatus comprising:

a correction signal generator, responsive to the sign bits Sr(i) of the received partial product signals PP(i) or analogs thereof, for generating a correction signal representing the sum of the sign extension subfields, where said correction signal has fewer bits than said sign extension subfields.

2. A receiving apparatus according to claim 1 wherein each of the received N partial product signals PP(i) represents a partial product pp(i) of the form, C×m(i), where m(i) is a signed multiplying factor, where i is an identifying digit in the range 1 to N, where C is a multiplicand, and wherein the correction signal generator includes:

means for logically arranging the received partial product signals in a hypothetical top to bottom order, PP(1) through PP(N), according to the relative bit positions of respective sign bits, Sr(1) through Sr(N), of the received partial product signals PP(1) through PP(N), the partial product signal PP(1) with the rightmost positioned sign bit Sr(1) being logically placed in a hypothetical row, rr1, at the top of the order and the partial product signal PP(N) with the leftmost positioned sign bit Sr(N) being logically placed in a hypothetical row, rrN, at the bottom of the order;

classification means for generating class signals indicating, for each received partial product signal, PP(i), whether its corresponding multiplying factor, m(i), is positive or negative; and collection means for collecting the class signals of the received partial product signals, and generating for each received partial product signal, PP(i), a category signal indicating whether any multiplying factor, m(j), corresponding to a hypothetical row rr(j) for j less than i, is negative.

3. A receiving apparatus according to claim 2 wherein each multiplying factor, m(i), is assignable to one of at least three mutually exclusive classes, Class-A, Class-B or Class-C, Class-A indicating that multiplying factor m(i) is zero or of a first polarity; Class-B indicating that multiplying factor m(i) has a first nonzero magnitude and a second polarity, opposed to the first polarity; Class-C indicating that multiplying factor m(i) has a second nonzero magnitude different from the first nonzero magnitude and the second polarity; and wherein the classification means generates class signals indicating, for each received partial product signal, whether its corresponding multiplying factor, m(i), belongs to Class-A, Class-B or Class-C.

4. A receiving apparatus according to claim 3 further comprising
logical OR means for receiving a plurality of class signals, each indicating whether a given partial product signal PP(i) has a corresponding multiplying factor m(i) belonging to a corresponding one of said mutually exclusive classes, for logically ORring the received class-indicating signals, the logically ORred result being used to produce a correction bit belonging to said correction signal.

5. An apparatus according to claim 3 wherein the correction signal is composed of successive bits CB(1a), CB(1b), CB(2a), CB(2b), CB(3a), CB(3b), etc., and the correction signal generator produces these correction bits CB(1a), CB(1b), ..., CB(ia), CB(ib) in accordance with the below truth table;

| INPUTS | | OUTPUTS | |
|---|---|---|---|
| AA Mutually Exclusive Classes of each m(i) | BB Does m(j) of any row pp(j) above row pp(i) belong to Class-B or to Class-C? | CC Corresponding Correction Bits | |
| | | CB(ib) | CB(ia) |
| A  m(i) = 0 or +1 or +2 | 0 1 | 0 1 | 0 1 |
| B  m(i) = −1 | 0 1 | 1 1 | 1 0 |
| C  m(i) = −2 | 0 1 | 1 0 | 0 1 |

6. A signal processing circuit for receiving binary encoded signals representing signed partial products pp(1), pp(2), .... pp(N), where each partial product pp(i) is of the form C×m(i), C being a multiplicand m(i) being a binary-coded multiplying factor that is separable from the multiplicant C and is associated with each partial product pp(i), where for i greater than 1 each multiplying factor m(i) has at least one more bit than a preceding multiplying factor m(i−1), where said signal processing circuit produces a result signal representing the sum of the signed partial products pp(1), pp(2), ... , pp(N) under a condition where the sign bit of each received partial product signal is in essence, unaccompanied by a corresponding sign extension subfield, the signal processing circuit comprising:

a correction-bits encoder circuit, responsive to the signal of each partial product p(i), for generating a correction signal having correction bits representing the sum of the sign extension subfields which conventionally would have accompanied the partial product representing signals where the correction signal has fewer bits than said sign extension subfields; and a summing circuit, coupled to receive the correction signal and to receive the partial products representing signals unaccompanied by corresponding sign ex extension subfield representing signals, for summing together the correction signal and the received partial product representing signals.

7. A signal processing circuit according to claim 6 wherein the signed partial products pp(1), pp(2), ..., pp(N), are produced as part of a Booth multiply function.

8. A signal processing circuit according to claim 6 wherein the summing circuit includes a Wallace tree adder.

9. A signal processing circuit according to claim 6 further comprising:
physical data transfer means, coupled to the summing circuit, for physically transferring the correction signal and the partial products representing signals unaccompanied by corresponding sign extension subfield representing signals to the summing circuit.

10. A signal processing circuit according to claim 9 wherein said physical data transfer means includes storage means for storing some or all of the transferred signals.

11. A signal processing apparatus for receiving a first signal having a first number $L_C$ of bits, the first signal representing a multiplicand, for receiving a second signal having a second number $L_M$ of bits, the second signal representing a multiplier, and for generating a result signal having a third number $L_C+L_M$ of bits, the result signal representing the product of the multiplicand and the multiplier; said signal processing apparatus comprising:

a partial product encoder circuit, responsive to the received first signal and the received second signal, for producing a plurality of binary encoded signals, PP(1), PP(2), ..., PP(N), representing signed partial products pp(1), pp(2), ..., pp(N), where each partial product pp(i) is of the form C×m(i), C being the first signal, m(i) being a binary-coded multiplying factor that is separable from the multiplicant C and that is associated with each partial product pp(i), where for i greater than 1 each multiplying factor m(i) has at least one more bit than a preceding multiplying factor m(i−1), where the partial products representing signals, PP(1), PP(2), ..., PP(N), produced by said partial product encoder circuit in essence do not include and are unaccompanied by signals representing corresponding sign extension subfields conventionally used when adding the signed partial products pp(1), pp(2), ..., pp(N):

a correction bits encoder circuit, coupled to the partial product encoder circuit, for generating a correction signal having correction bits representing the sum of the sign extension subfields which conventionally would have accompanied the partial products representing signals, PP(1), PP(2), ..., PP(N), where the correction signal has fewer bits than the sign extension subfields that the correction signal replaces; and a summing circuit, coupled to receive the correction signal and to receive the partial products representing signals unaccompanied by corresponding sign extension subfield representing signals, for summing together the correction signal and the received partial product representing signals.

12. A signal processing apparatus according to claim 11 wherein the partial product encoder circuit produces said partial products representing signals, PP(1), PP(2), ..., PP(N), in accordance with a Booth multiplier algorithm.

* * * * *

UNITED STATES PATENT AND TRADEMARK OFFICE
CERTIFICATE OF CORRECTION

PATENT NO. : 5,251,167

DATED : October 5, 1993

INVENTOR(S) : Stephen M. Simmonds et al.

It is certified that error appears in the above-identified patent and that said Letters Patent is hereby corrected as shown below:

| | |
|---|---|
| Column 3, line 40, | "$(L_M1)/2$" should be --$(L_M+1)/2$. |
| Column 4, line 5, | After "in the" insert --trapezoidal area is approximately 0.75 $L_M(L_M+1)$. |
| Column 4, line 6, | Before "created" insert a paragraph and --Referring to Table-2, partial product number 1 is--. |
| Column 4, line 7, | "(c)" should be --(o)--. |
| Column 4, line 9, | After "aligned" insert --in the active window position (bit position 0). The.--. |
| Column 4, line 36, | After "the" insert --remainder--. |
| Column 6, line 24, | After "100" insert a space. |
| Column 10, line 16, | After "zero" insert --state--. |
| Column 13, line 11, | After "234b," insert -- ..., --. |
| Column 13, line 12, | "b" should be --B--. |
| Column 13, line 12, | After "CB(4)," insert -- ..., --. |
| Column 13, line 58, | After "pp2," insert -- ..., --. |
| Column 15, line 33, | Before "respectively" insert a paragraph and --The three major columns of DIAGRAM-12 are--. |
| Column 15, line 68, | "GRAM12," should be --GRAM-12,--. |

UNITED STATES PATENT AND TRADEMARK OFFICE
CERTIFICATE OF CORRECTION

PATENT NO. : 5,251,167

DATED : October 5, 1993

INVENTOR(S) : Stephen M. Simmonds et al.

It is certified that error appears in the above-identified patent and that said Letters Patent is hereby corrected as shown below:

| | |
|---|---|
| Column 17, line 2, | After "and" insert --Class-C are mutually exclusive of one another, gate 431b--. |
| Column 17, line 48, | After "CB(28b)" insert a period --.--. |
| Column 18, line 23, | After ". . ." insert a comma --,--. |
| Column 19, line 29, | After "table" delete the semicolon and insert a colon --:--. |
| Column 19, line 47, | the fourth period should be a comma --,--. |
| Column 19, line 48, | After "multiplicand" insert a comma --,--. |
| Column 19, line 49, | "multiplicant" should be --multiplicand--. |
| Column 20, line 1, | Delete first "ex". |

Signed and Sealed this

Twenty-seventh Day of February, 1996

Attest:

BRUCE LEHMAN

Attesting Officer     Commissioner of Patents and Trademarks